(12) United States Patent
Schmitt

(10) Patent No.: US 10,880,153 B2
(45) Date of Patent: Dec. 29, 2020

(54) METHOD AND SYSTEM FOR PROVIDING SERVICE REDUNDANCY BETWEEN A MASTER SERVER AND A SLAVE SERVER

(71) Applicant: OVH, Roubaix (FR)

(72) Inventor: Mathieu Schmitt, Montreal (CA)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 16/543,020

(22) Filed: Aug. 16, 2019

(65) Prior Publication Data
US 2020/0067761 A1 Feb. 27, 2020

(30) Foreign Application Priority Data
Aug. 27, 2018 (EP) .................................. 18315021

(51) Int. Cl.
*H04L 12/24* (2006.01)
*H04L 12/26* (2006.01)

(52) U.S. Cl.
CPC ...... *H04L 41/0668* (2013.01); *H04L 43/0817* (2013.01); *H04L 43/10* (2013.01)

(58) Field of Classification Search
CPC ............. H04L 67/1097; H04L 67/1095; H04L 2209/38; H04L 63/101; H04L 9/3239; H04L 43/0817; H04L 67/10; H04L 9/3236; H04L 9/3247; H04L 2209/56; H04L 41/0668; H04L 41/0803; H04L 43/10; H04L 47/70; H04L 63/0428; H04L 63/102; H04L 67/06; H04L 9/14; H04L 12/4633; H04L 2209/805; H04L 29/06; H04L 29/08; H04L 41/0896; H04L 41/12; H04L 41/5019; H04L 41/5022; H04L 41/5032; H04L 43/06; H04L 43/0823; H04L 43/16; H04L 45/28; H04L 47/72; H04L 47/762;
(Continued)

(56) References Cited

U.S. PATENT DOCUMENTS 5,781,716 A 7/1998 Hemphill et al.
5,812,751 A 9/1998 Ekrot et al.
(Continued)

FOREIGN PATENT DOCUMENTS

EP 2866422 A1 4/2015

OTHER PUBLICATIONS

European Search Report with regard to the counterpart EP Patent Application No. 18315021.8 dated May 3, 2019.

*Primary Examiner* — Djenane M Bayard
(74) *Attorney, Agent, or Firm* — BCF LLP

(57) ABSTRACT

Methods of and systems provide service redundancy between a master server and a slave server. The master server provides access to a pool of resources to a client. In response to detecting a fault on the master server, the master server is marked as disabled and services held on the master server are switched to the slave server and to a secondary pool of resources. The master service may be restarted if down. Then, provided that the master server is up, one or more tests are performed on the master server. The master server is marked as enabled if the tests are successful. The services may be switched back to the master server when the server is enabled. Services may further be rolled back to the slave server in case of an additional fault occurrence. The technique may also be used for updating a configuration in a service infrastructure.

14 Claims, 10 Drawing Sheets

(58) Field of Classification Search
CPC .............. H04L 61/2007; H04L 63/123; H04L
63/1441; H04L 63/1491; H04L 67/02;
H04L 67/1002; H04L 67/1008; H04L
67/1012; H04L 67/1029; H04L 67/1034;
H04L 67/141; H04L 67/148; H04L
67/2823; H04L 67/306; H04L 67/42;
H04L 69/22; H04L 69/24; H04L 69/40;
H04L 9/0637; H04L 9/0643; H04L
9/3213; H04L 12/18; H04L 63/0227;
H04L 63/10; H04L 63/08; H04L 63/105;
H04L 67/303; H04L 29/08846; H04L
63/06; H04L 67/08; H04L 67/14; H04L
67/16; H04L 67/28; H04L 67/2814; H04L
67/2819; H04L 67/2842; H04L 69/329;
H04L 12/12; H04L 12/40039; H04L
12/40052; H04L 12/437; H04L 29/08072;
H04L 41/5054; H04L 29/12066; H04L
41/0213; H04L 61/1511; H04L 63/0263;
H04L 63/1458; H04L 47/24; H04L
41/5009; H04L 69/08; H04L 12/2836;
H04L 29/06068; H04L 29/06156; H04L
29/06476; H04L 29/08756; H04L 41/024;
H04L 41/0631; H04L 41/0659; G06F
9/5077; G06F 21/53; G06F 21/6218;
G06F 21/629; G06F 2209/541; G06F
2221/2149; G06F 3/1415; G06F 3/1438;
G06F 3/1462; G06F 9/485; G06F 9/5027;
G06F 9/5055; G06F 9/5088; G06F 9/54;
G06F 13/4247; G06F 1/3203; G06F
16/2255; G06F 11/2038; G06F 2201/80;
G06F 3/065; G06F 3/067; G06F 3/0614;
G06F 11/1482; G06F 11/2007; G06F
11/2046; G06F 11/2056; G06F 11/2097;
G06F 11/3006; G06F 11/323; G06F
11/3419; G06F 11/3452; G06F 11/3466;
G06F 11/3612; G06F 11/3616; G06F
11/3636; G06F 16/184; G06F 16/211;
G06F 16/219; G06F 16/22; G06F
16/2246; G06F 16/2272; G06F 16/2365;
G06F 16/2452; G06F 16/252

See application file for complete search history.

(56) References Cited

U.S. PATENT DOCUMENTS

| | | | |
|---|---|---|---|
| 6,477,663 | B1 | 11/2002 | Laranjeira et al. |
| 8,229,886 | B2 | 7/2012 | Sarkar et al. |
| 8,359,493 | B2 | 1/2013 | Peng et al. |
| 8,738,958 | B2 | 5/2014 | Goroff et al. |
| 9,641,449 | B2 | 5/2017 | Anaya et al. |
| 10,372,561 | B1* | 8/2019 | Wei .................. G06F 3/0611 |
| 2003/0037133 | A1 | 2/2003 | Owens |
| 2007/0168711 | A1 | 7/2007 | Chen |
| 2008/0148098 | A1* | 6/2008 | Chen ................ G06F 11/2028 714/13 |
| 2008/0201602 | A1* | 8/2008 | Agarwal ............ G06F 11/2097 714/4.1 |
| 2012/0030513 | A1* | 2/2012 | Peng ................. G06F 11/2097 714/37 |
| 2012/0166390 | A1* | 6/2012 | Merriman ......... G06F 16/2365 707/613 |
| 2014/0359340 | A1* | 12/2014 | Hua .................... H04L 65/1016 714/4.11 |
| 2015/0370648 | A1 | 12/2015 | Mashima et al. |
| 2019/0171363 | A1* | 6/2019 | Hardy .................. G06F 3/065 |
| 2019/0370136 | A1* | 12/2019 | Smeaton ............. G06F 3/0614 |

* cited by examiner

METHOD AND SYSTEM FOR PROVIDING SERVICE REDUNDANCY BETWEEN A MASTER SERVER AND A SLAVE SERVER

CROSS-REFERENCE

The present application claims priority from European Patent Application No. 1 831 5021.8 filed on Aug. 27, 2018, the entirety of which is incorporated herein by reference.

FIELD

The present technology relates to systems and methods used for providing service redundancy between a master server and a slave server.

BACKGROUND

Large-scale data farms that provide cloud computing, searching, data storage, web hosting and similar services typically include hundreds or even thousands of servers. Very high availability is frequently an important requirement of these data farms. Although definitions of very high availability may vary, acceptable downtime per day for a given hosted service may sometimes be expressed in terms of milliseconds or even microseconds. Availability levels may also be expressed in terms of a "number of nines" in percentage form, for example "six nines" meaning 99.9999% availability, which is equivalent to no more than 86 milliseconds of downtime per day. Service level agreements (SLA) define contractual obligations of the data farm owners in terms of availability levels of services sold to their clients.

Consequently, in a data farm, clusters are formed to combine servers in groups used as 'master servers' and 'slave servers'. A master server, also called 'main server', usually performs the tasks such as data storage and data processing offered to clients by the data farm. In case of a fault (including in case of a suspected fault, proven or not), in order to ensure high availability, the tasks of the master server are transferred to a corresponding slave server, also called 'redundant server'. Service will be switched back to the master (or main) server once the situation having cause the fault diagnostic has been corrected. Loss of both master and slave servers could lead to long-term loss of service, a duration of which may far exceed the downtime specified in SLAs. For that reason, it is desired to return service back to the master servers as quickly as possible to preserve redundancy.

Even though the recent developments identified above may provide benefits, technological improvements in the construction and operation of service infrastructures based on master-slave server configurations are still desirable. Fault recovery processes of current master-slave architectures are inefficient. For example, master-slave server architectures are not capable of automatically returning service functions from the slave server to the master server. Operator intervention is required to verify that the master server can safely recover service and switch back from slave (redundant) servers to master (main) servers. This operator intervention involves long and recurrent diagnostic activities that are at once time consuming, costly and error prone. For example, once a fault has been repaired, it may take 10 to 15 minutes for an operator to manually execute a variety of tests required to ensure that service can be safely returned to the master server. The operator may omit one among a number of required tests, or commit other errors. Errors may be the cause of service availability losses and of breaches of contractual commitments to service availability. Authentication of the person who performs the diagnostic and initiates the switch back may be lacking. Human nature is such that the operator having caused an error, for example by switching back a service to the master server without having correctly and fully solved the root cause of a fault, may attempt to hide that fact. The lack of non-repudiation is thus at least a potential issue.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) manpower costs required for performing switch backs from slave servers to master servers; (2) delays caused by the need for operator intervention; and/or (3) possible errors resulting from operator intervention.

In one aspect, various implementations of the present technology provide a method for providing service redundancy between a master server and a slave server. The method comprises: detecting a fault on the master server; in response to detecting the fault, marking the master server as disabled; in response to detecting the fault, switching to the slave server one or more services held on the master server; if the master server is down after switching the one or more services to the slave server, restarting the master server until the master server is up; after switching the one or more services to the slave server and when the master server is up, performing one or more tests on the master server; and if the one or more tests are successful, marking the master server as enabled.

In some implementations of the present technology, a primary pool of resources has a first direct link to the master server; a secondary pool of resources has a second direct link to the slave server; and the primary and secondary pools of resources have equivalent configurations.

In some implementations of the present technology, the method further comprises, when the one or more services are held on the master server: sending a copy of first data related to the one or more services from the master server to the slave server, sending a first copy of second data related to the one or more services from the master server to the primary pool of resources via the first direct link, and sending a second copy of the second data related to the one or more services from the master server to the secondary pool of resources via a first side link and; when the master server is disabled: blocking the first direct link and the first side link, sending a third copy of the second data related to the one or more services from the slave server to the primary pool of resources via a second side link, and sending a fourth copy of the second data related to the one or more services to the secondary pool of resources via the second direct link.

In some implementations of the present technology, the method further comprises: periodically sending heartbeat signals on a main link from the slave server to the master server; receiving each heartbeat signal causing the master server to send a response on the main link from the master server to the slave server; and the fault on the master server being detected when no response to a given heartbeat signal is received at the slave server within a predetermined time period after sending the given heartbeat signal.

In some implementations of the present technology, the method further comprises switching back the one or more services from the slave server to the master server if the one or more tests are successful.

In some implementations of the present technology, the method further comprises: rolling back the one or more services to the slave server and marking again the master server as disabled if a new fault is detected after the switching back; starting a timer after the rolling back and; upon expiry of the timer: if the master server is down, restarting again the master server until the master server is up, when the master server is up, performing again the one or more tests on the master server, and marking again the master server as enabled if the one or more performed again tests are successful.

In some implementations of the present technology, the method further comprises: sending a single heartbeat signal from the slave server to the master server; and declaring a first test among the one or more tests as successful if a response to the single heartbeat signal is received at the slave server within a predetermined time period after sending the single heartbeat signal.

In some implementations of the present technology, the method further comprises: reloading service data controlled by the master server; executing service operations on the reloaded service data while maintaining the master server in a closed-loop environment; fetching service data controlled by the slave server; and declaring a second test among the one or more tests as successful if a state of the service data in the closed-loop environment matches the service data controlled by the slave server.

In some implementations of the present technology, a third test among the one or more tests comprises: fetching a client IP address and/or a client VLAN from the slave server; defining a test IP address in the master server; and declaring a third test among the one or more tests as successful if the test IP address allows the master server to communicate with the slave server and with a gateway of a client corresponding to the client IP address and/or the client VLAN.

In other aspects, various implementations of the present technology provide a system for providing service redundancy. The system comprises: a master server; a slave server; and a controller operatively connected to the master server and to the slave server. The controller is configured to: receive information about a fault on the master server, in response to receiving the information about the fault, (i) mark the master server as disabled, (ii) cause one or more services held on the master server to switch to the slave server, and (iii) if the master server is down, cause a restart of the master server until the master server is up, after the switch of the one or more services to the slave server and when the master server is up, perform one or more tests on the master server and, if the one or more tests are successful, mark the master server as enabled.

In some implementations of the present technology, the system further comprises a main link connecting the master server to the slave server, the master server being adapted to send a copy of first data related to the one or more services to the slave server when the one or more services are held on the master server.

In some implementations of the present technology, the system further comprises: a primary pool of resources connected to the master server via a first direct link and to the slave server via a second side link; and a secondary pool of resources connected to the slave server via a first direct link and to the master server via a first side link.

In some implementations of the present technology: the master server is adapted to send copies of second data related to the one or more services via the first direct link to the primary pool of resources and via the first side link to the secondary pool of resources when the one or more services are held on the master server; and the slave server is adapted to send a copy of the second data related to the one or more services via the second side link to the primary pool of resources when the master server is marked as disabled.

In some implementations of the present technology, the system further comprises: an operator interface operatively connected to the controller and adapted to forward operator commands to the controller, the operator commands being related to one or more of a software update of the master server, a physical intervention on the master server, and a maintenance of the master server; the controller being further adapted to: disable the service redundancy when at least one of the one or more operator commands is received at the operator interface, enable the service redundancy when none of the operator commands is received at the operator interface, and cause a switch back of the one or more services from the slave server to the master server when the master server is marked as enabled and the service redundancy is enabled.

In some implementations of the present technology, the system further comprises a database operatively connected to the controller and adapted to store a log containing one or more of an identity of the master server in which the fault is detected, an identity of the slave server on which the one or more services are switched, a type of the fault, a time of occurrence of the fault, a duration of the one or more tests, and a result of the one or more tests.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
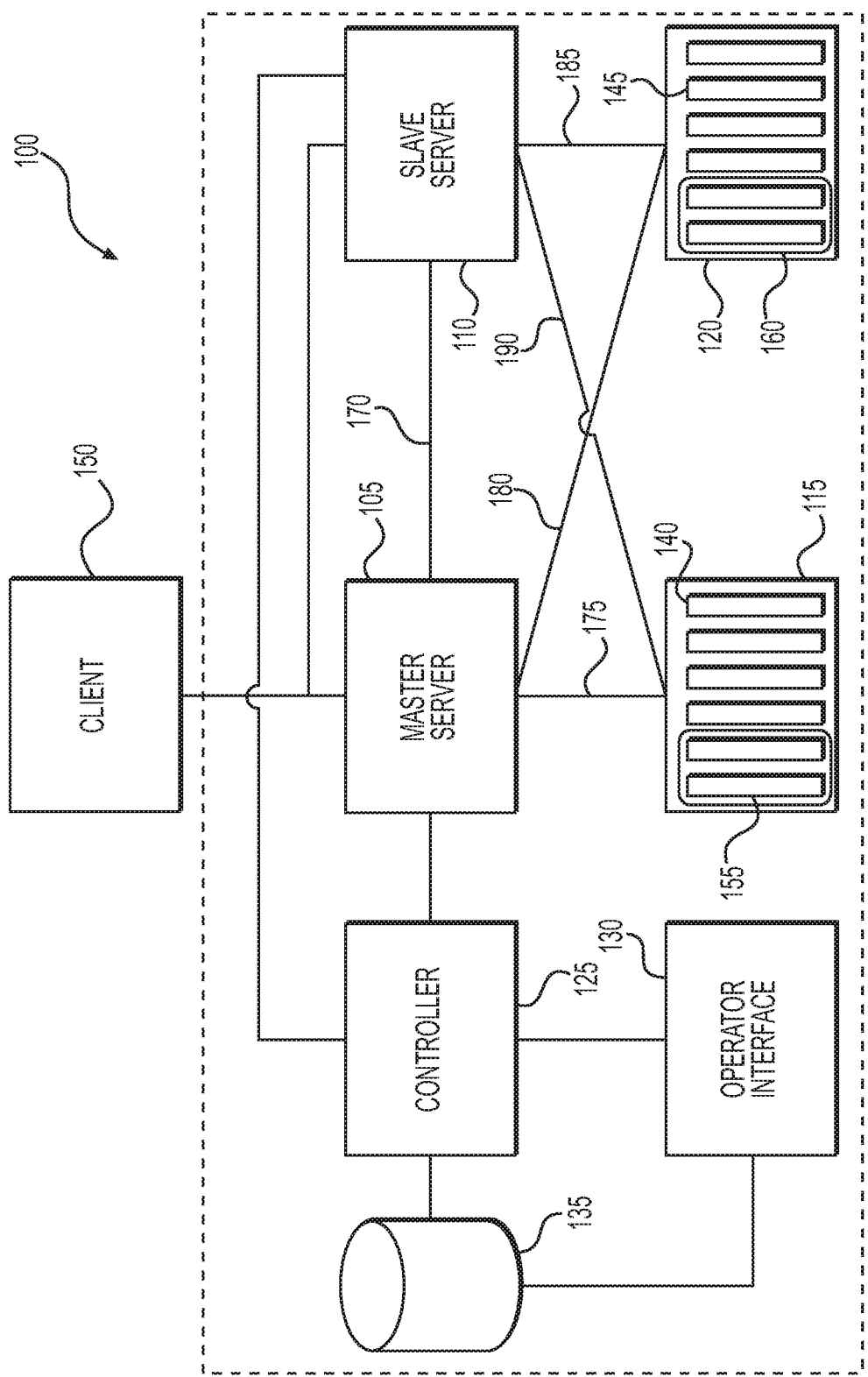
FIG. 1 is a simplified block diagram of a service infrastructure in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In a service infrastructure, for example in a datacenter, servers control pools of resources that are made available to offer services to clients of the service infrastructure. Server redundancy is provided for reliability purposes. A server defined as a 'master server', 'master head', 'main server' or 'main head', is paired with another server having the same or equivalent capabilities, this other server being defined as a 'slave server', 'slave head', 'redundant server' or 'redundant head'. The master server normally provides the services to one or more clients, for example by providing access to a pool of resources. The slave server is connected to an equivalent pool of resources. When a fault occurs on the master server, the master server is marked as disabled and service is automatically switched, i.e. transferred, to the slave server that controls an equivalent pool of resources. The master server may be restarted after a fault has caused its services to be switched to the slave server and, while the master server is up, tests are automatically performed to ensure that the master server is capable of recovering the services. When the tests are successful, the master server is marked as enabled and the services may be switched back to the master server.

With these fundamentals in place, we will now consider some non-limiting examples to illustrate various implementations of aspects of the present technology.

Referring now to the Drawings, FIG. 1 is a simplified block diagram of a service infrastructure 100 in accordance with an embodiment of the present technology. The service infrastructure 100 forms a system capable of providing service redundancy. As illustrated, the service infrastructure 100 comprises a master server 105, a slave server 110, a primary pool of resources 115, a secondary pool of resources 120, a controller 125, an operator interface 130 and a database 135. The controller 125 is operatively connected to the master server 105, to the slave server 110, to the operator interface 130 and to the database 135. The controller 125 acts as a robot that controls service redundancy features of the service infrastructure 100. The primary pool of resources 115 includes one or more actual resources 140, including active and/or passive resources for example memory devices, disks, disk drives, computers, auxiliary servers, game servers, and the like. The secondary pool of resources 120 also includes one or more actual resources 145. The primary and secondary pools of resources 115 and 120 either include identical sets of actual resources 140 and 145 or, equivalent combinations of actual resources 140 and 145. The service infrastructure 100 as shown on FIG. 1 is greatly simplified. An actual service infrastructure would include a large number of master and slave server pairs, possibly hundreds or thousands of such master and server pairs, and would serve a large number of clients. Each master and slave server pair may provide one or more services to one or more clients. The actual service infrastructure would also include gateways for Internet access as well as other components used for performance monitoring, billing and accounting, Internet security, and the like. FIG. 1 is simplified for illustration purposes. In particular and without limitation, the service infrastructure 100 may comprise a plurality of pairs of master and slave servers providing access to a plurality of pairs of primary and secondary pools of resources to a large number of clients.

A client 150 is connected to the infrastructure 100 and normally receives services from the master server 105 and, more particularly, through grant of access to some of the actual resources 140. A client area 155 is defined in the primary pool of resources 115 to store information related to one or more services provided by the service infrastructure 100 to the client 150. If the master server 105 is disabled following a fault, the client 150 receives services from the slave server 110, being granted access to some of the actual resources 145. A client area 160 is defined in the secondary pool of resources 120 to also store information related to one or more services provided by the service infrastructure 100 to the client 150.

Various connections are established between the components of the service infrastructure 100. Notably, a main link 170 connects the master server 105 and the slave server 110, a first direct link 175 connects the master server 105 to the primary pool of resources 115, a first side link 180 connects the master server 105 to the secondary pool of resources 120, a second direct link 185 connects the slave server 110 to the secondary pool of resources 120, and a second side link 190 connects the slave server 110 to the primary pool of resources 115.

In normal operation, the master server 105 is enabled and provides one or more services to the client 150. The master server 105 sends a copy of first data related to one or more services to of the client 150 the slave server 110, via the main link 170. This first data may comprise information about the client 150 and about the services provided thereto, for example and without limitation, an IP address and/or a virtual local area network (VLAN) of the client 150. The first data may also comprise a service configuration file for the services provided to the client 150. The master server 105 also sends copies of second data related to the one or more services of the client 150 via the first direct link 175 to the primary pool of resources 115 for processing and/or storage in the client area 155 and via the first side link 180 to the secondary pool of resources 120 for processing and/or storage in the client area 160. This second data may comprise any content of the client 150, including without limitation a file, a software, a virtual machine, banking information, executable code, archived information, and the like.

It will be understood that the above mentioned first and second data related to the one or more services of the client 150 are not necessarily static but may evolve and be updated over time, and may be exchanged in any direction between the master or slave servers 105 and 110 and the primary and secondary pools of resources 115 and 120. For example, data may be stored in the client area 155 upon request from the client 150, and retrieved therefrom when requested by the client 150. As such, this data may be sent from the client area 155 to the client 150 through the master server 105. Data in the client area 155 may be updated if the pool of resources 115 contains equipment capable of executing software, in which case the master server 105 may be informed of the update by the pool of resources 115 and forward updated data to the secondary pool of resources 120 via the first side link 180.

Still in normal operation, the slave server 110 periodically sends heartbeat signals on the main link 170 to the master server 105. The master server 105 receives each periodic heartbeat signal and immediately provides a corresponding response on the main link 170. If the slave server 110 does not receive a response to a given heartbeat signal within a predetermined time period after sending the given heartbeat signal, a fault is present on the master server 105.

When it discovers a fault on the master server 105, the slave server 110 informs the controller 125 of the detected fault on the master server 105. In response to being informed of the fault, the controller 125 marks the master server 105 as disabled, causes the services held on the master server 105 to switch to the slave server 110. Switching the services to the slave server 110 may for example be performed through the following operations. IP addresses for each service are dismounted from the master server 105 and mounted on the slave server 110. Then, data related to the services are exported from the master server 105 to the slave server 110. It is then verified that the exported data is not longer effectively present on the master server 105.

The controller 125 has a monitoring function that verifies the state of the master servers in the service infrastructure 100. If the controller 125 cannot communicate with the master server 105, the master server 105 may be down. In this case, the controller 125 may cause a restart of the master server 105 when the master server 105 is down.

The controller 125 may also cause a blocking of the main link 170, preventing any communication between the master server 105 and the slave server 110 when the master server 105 is marked as disabled, also causing a blocking of the first direct link 175, and of the first side link 180. When the slave server 110 takes charge of the provision of services to the client 150, following the detection of a fault at the master server 105, the slave server 110 sends copies of the second data related to the one or more services of the client 150 via the second direct link 185 to the secondary pool of resources 120 for processing and/or storage in the client area 165 and via the second side link 190 to the primary pool of resources 115 for processing and/or storage in the client area 155.

When the master server 105 is disabled, the services to the client 150 being provided by the slave server 110, the controller 105 performs one or more tests on the master server 105 provided that the master server 105 is up. Examples of these tests are described hereinbelow. In case of failure of one or more of the tests, the controller 125 maintains disabled mark on the master server 105 and may raise an alarm on the operator interface 130. If these tests are successful, the controller 125 marks the master server 105 as enabled.

In one embodiment, the master server 105 and the slave server 110 are considered as forming a symmetric pair. In this case, after marking the master server 105 as enabled, the controller 125 may exchange the roles of the master server 105 and of the slave server 110 so that the physical device identified with reference number 105 on FIG. 1 becomes a new slave server and the physical device identified with reference number 10 on FIG. 1 becomes a new master server.

In another embodiment, the master server 105 and the slave server 110 form an asymmetric pair and their roles are not interchangeable. In this embodiment, having marked the master server 105 as enabled, the controller 125 causes a switch back of the services provided to the client 150 from the slave server 110 to the master server 105. In a variant, the controller 125 may receive, from the operator interface 130, operator commands related to a software update of the master server 105, a physical intervention on the master server 105, or a maintenance of the master server 105. When receiving any one of these commands, the controller 125 marks service redundancy as disabled for the pair formed by the master server 105 and the slave server 110. When none of these commands is active, the controller marks service redundancy as enabled. In this variant, switch back of the services provided to the client 150 from the slave server 110 to the master server 105 does not take place unless the service redundancy is enabled.

As expressed hereinabove, the service infrastructure 100 may include a large number of master and slave server pairs. The database may store a log containing one or more of an identity of the master server 105 in which a fault has been detected, an identity of the slave server 110 on which services are switched, a type of the fault, a time of occurrence of the fault, a duration of the one or more tests, and a result of the one or more tests. A content of the log may be output on the operator interface 130.

Figure 2:
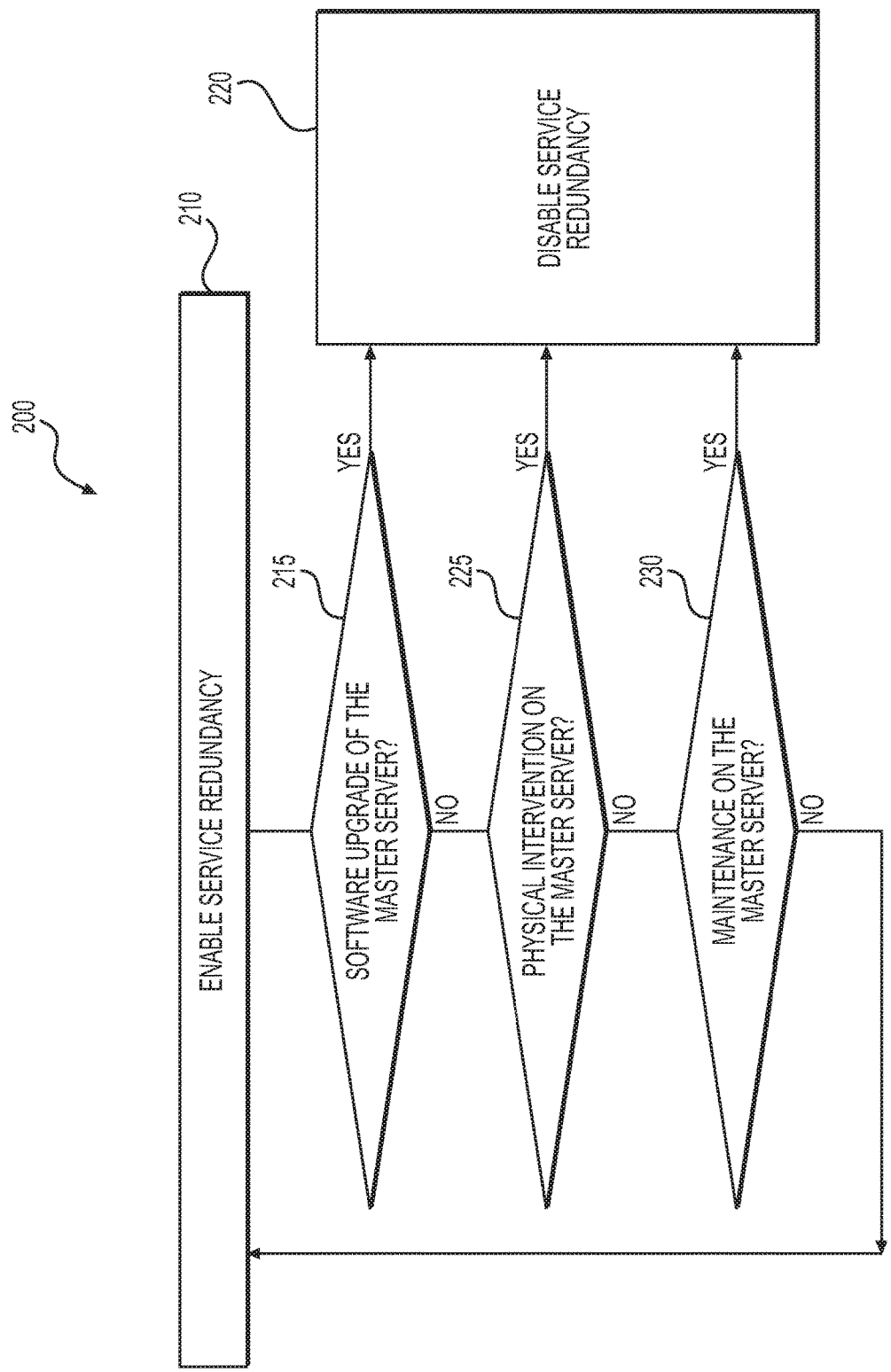
FIG. 2 is a sequence diagram showing operations for enabling or disabling service redundancy in a service infrastructure in accordance with an embodiment of the present technology.

FIG. 2 is a sequence diagram showing operations for enabling or disabling service redundancy in a service infrastructure in accordance with an embodiment of the present technology. On FIG. 2, a sequence 200 comprises a plurality of operations that may be executed in variable order, some of the operations possibly being executed concurrently, some of the operations being optional. Initially at operation 210, which is representative of a normal situation for the service infrastructure 100, service redundancy is enabled by the controller 125 for the master server 105 and the slave server 110. At operation 215, a test is made to verify if an operator command is received at the operator interface 130 to indicate that a software upgrade is initiated on the master server 105. If so, the controller 125 disables service redundancy for the master server 105 and the slave server 110 at operation 220. Otherwise, operation 225 verifies if an operator command indicates that a physical intervention is to take place on the master server 105—a physical intervention may for example comprise replacement of a circuit car on the master server 105 or replacement of a resource in the primary pool of resources 115. If so, the controller 125 disables service redundancy for the master server 105 and the slave server 110 at operation 220. Otherwise, operation 230 verifies if an operation command indicates that maintenance of the master server 105 is planned. If so, the controller 125 disables service redundancy for the master server 105 and the slave server 110 at operation 220. If none of operations 215, 225 or 230 causes the disabling of service redundancy, the sequence returns to operation 210.

The sequence 200 may or may not be present in some embodiments that may not have any means for disabling service redundancy.

Although operations 210, 215, 220, 225 and 230 are illustrated as a sequence 200, they may be implemented in order forms, for example by use of flags for each of the tests of operations 215, 225 and 230, service redundancy being enabled when none of these flags is set and disabled when any one of these flags is set. Also, an operator command received at the operator interface 130 may relate to any one of the master servers, to a group of master servers, or to all master servers of the service infrastructure 100.

Figure 3:
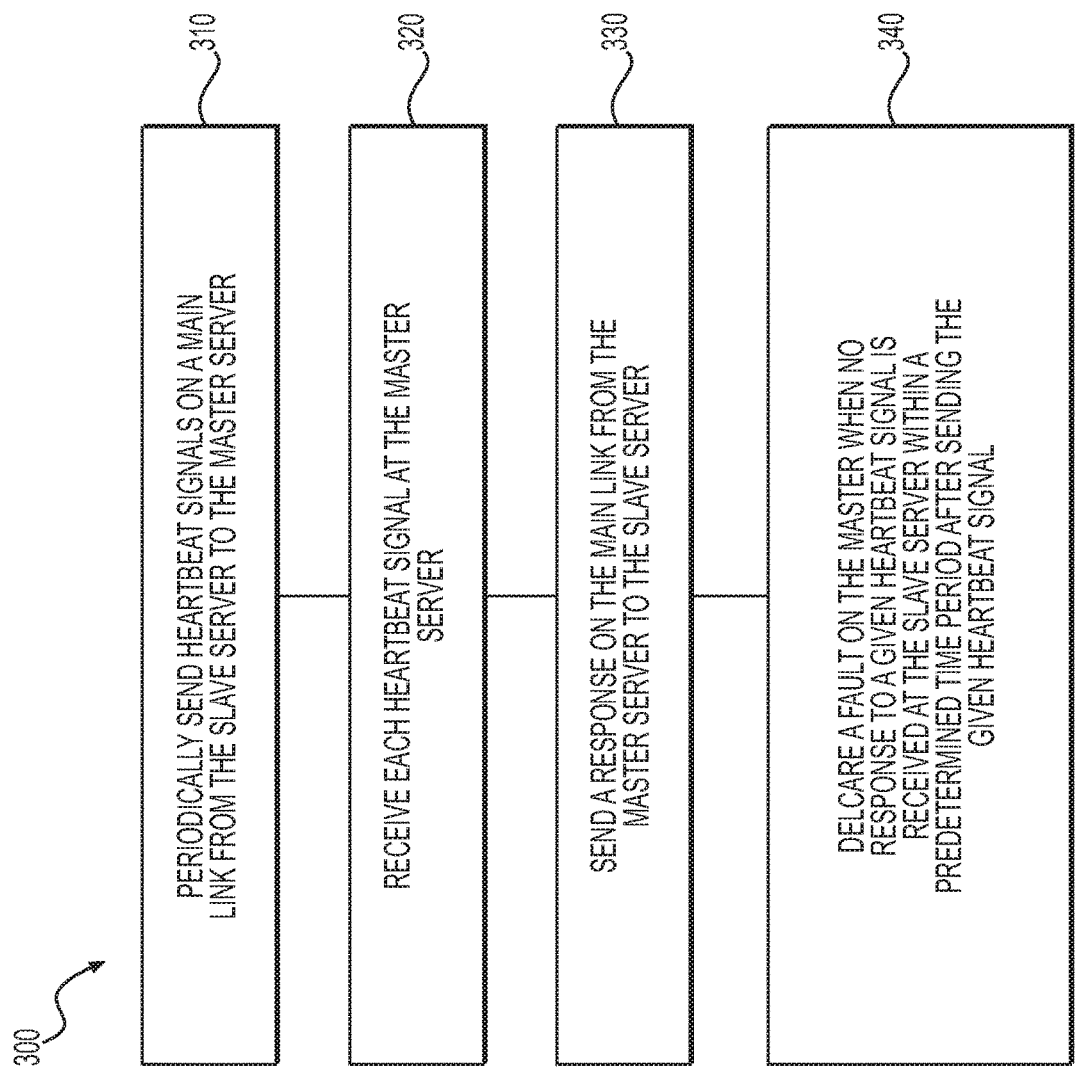
FIG. 3 is a sequence diagram showing operations for detecting a master server fault in a service infrastructure in accordance with an embodiment of the present technology.

FIG. 3 is a sequence diagram showing operations for detecting a master server fault in a service infrastructure in accordance with an embodiment of the present technology. On FIG. 3, a sequence 300 comprises a plurality of operations that may be executed in variable order, some of the operations possibly being executed concurrently, some of the operations being optional. At operation 310, heartbeat signals are periodically sent on the main link 170 from the slave server 110 to the master server 105. Receiving each heartbeat signal at the master server 105 at operation 320 causes the master server 105 to send a response on the main link 170 to the slave server 110 at operation 330. The slave server 110 declares a fault on the master server at operation 340 when no response to a given heartbeat signal is received at the slave server 110 within a predetermined time period after sending the given heartbeat signal.

The sequence 300 may or may not be present in some embodiments and other techniques may be used to detect a fault on the master server 105.

Figure 4:
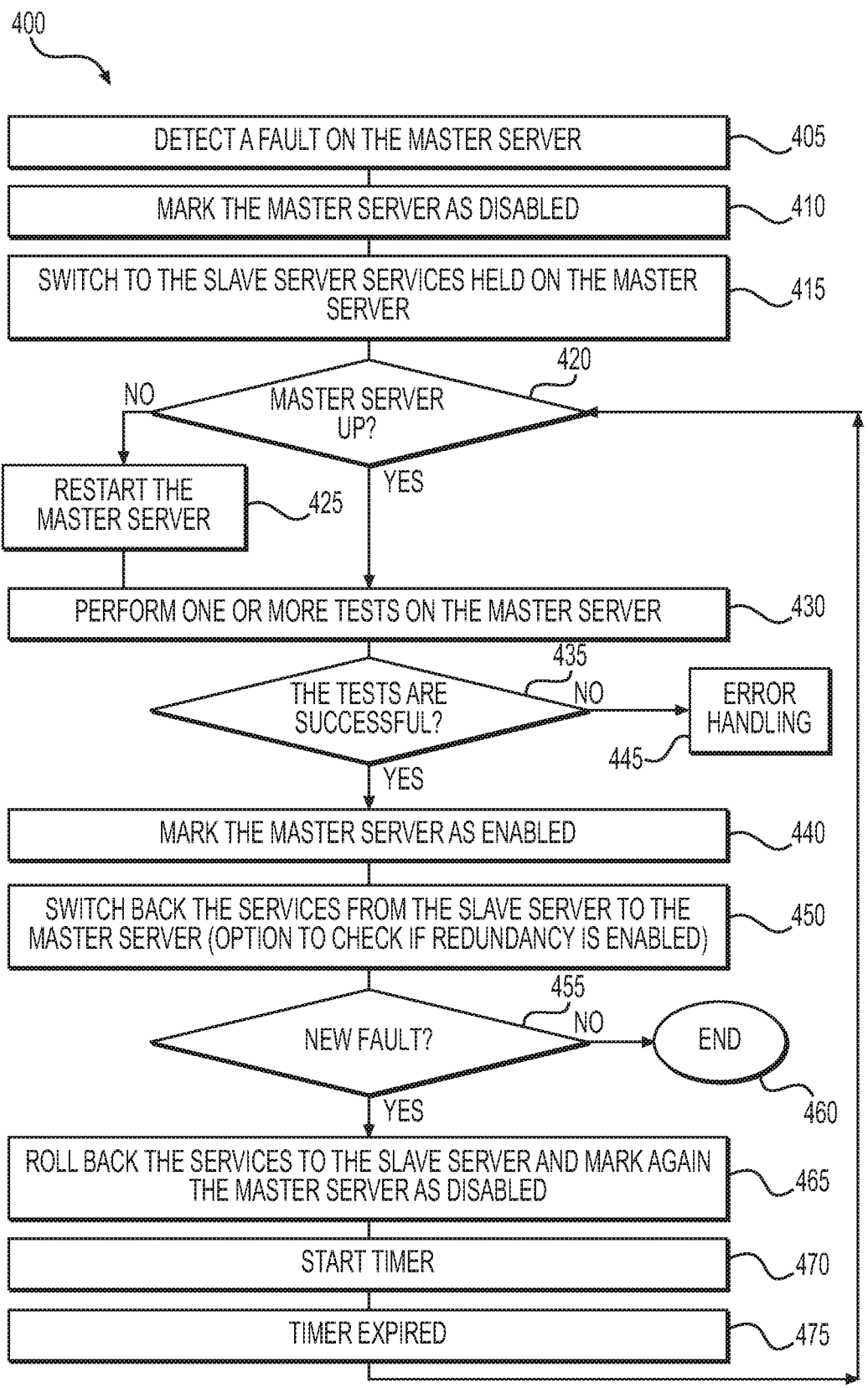
FIG. 4 is a sequence diagram showing operations of a method for providing service redundancy between a master server and a slave server in a service infrastructure in accordance with an embodiment of the present technology.

FIG. 4 is a sequence diagram showing operations of a method for providing service redundancy between a master server and a slave server in a service infrastructure in accordance with an embodiment of the present technology. On FIG. 4, a sequence 400 comprises a plurality of operations that may be executed in variable order, some of the operations possibly being executed concurrently, some of the operations being optional. The sequence 400 starts at operation 405 when a fault is detected on the master server 105, for example and without limitation, through execution of the sequence 300 (FIG. 3). In response to detecting the fault, the controller 125 marks the master server 105 as disabled at operation 410. Also in response to detecting the fault, at operation 415, the controller 125 causes switching, to the slave server 110, one or more services held on the master server 105 for the client 150 or for a plurality of clients.

The services now being held on the slave server 110, the controller 125 verifies at operation 420 whether the master server 105 is currently up. In the context of the present disclosure, the master server 105 being 'up' means that the master server 105 is at least capable of communicating with the controller 125. If the master server 105 is down, the controller 125 causes a restart of the master server 105 at operation 425. In the context of the present disclosure, the term 'restart' encompasses the terms 'reload', 'reboot', 're-initialization' and any other similar or equivalent terms. When the master server 105 is up, either as determined at operation 420 or following the restart at operation 425, the sequence 400 continues at operation 430 when the controller 125 performs or causes to perform one or more tests on the master server 105; non-limiting examples of these tests are provided on FIGS. 5, 6, and 7. Verification is made at operation 435 to determine whether the tests are successful. At operation 440, the controller 125 marks the master server 105 as enabled if the tests are successful. If the verification made at operation 435 shows that one or more tests have failed, the sequence 400 ends at operation 445 where an error handling routine is initiated. The error handling routine is described hereinbelow in relation to FIG. 8.

As mentioned in the description of FIG. 1, the master server 105 and the slave server 110 may form a symmetric pair, in which case the slave server 110 (now construed as a new master server) may continue providing the services to the client 150. In an asymmetric configuration, operation 450 may comprise switching back the one or more services for the client 150 from the slave server 110 to the master server 105, provided that the one or more tests are successful. Optionally, operation 450 may be made conditional to the service redundancy being enabled in the sequence 200 (FIG. 2).

Operation 455 comprises a test determining whether a new fault is detected on the master server 105. The sequence 400 terminates at operation 460 if no new fault is detected at operation 455. Operation 455 may for example comprise a continuous execution of the sequence 300 (FIG. 3) so although the sequence 400 may terminate at operation 460, ongoing processing of the present service redundancy technology may actually continue.

If a new fault is detected at operation 455, the one or more services for the client 150 may be rolled back to the slave server 110 at operation 465, this operation also including marking again the master server 105 as disabled. After the roll back, a timer is started in the controller 125 at operation 470. When the timer expires at operation 475, the sequence 400 returns to operation 420 where the controller 125 verifies again whether the master server 105 needs to be restarted again at operation 425. Whether or not a restart takes place at operation 425, the sequence 400 continues at operation 430 to perform again the one or more tests on the master server 105, and at operation 435 to determine whether the tests are successful, other operations of the sequence 400 following as described hereinabove.

A variety of tests may be performed on the master server 105 at operation 430 of FIG. 4. These tests may be defined at least in part based on types of the services provided to the client 150 and to other clients that may be served by the master server 105 and, occasionally, by the slave server 110. The tests may also be defined at least in part based on types of equipment in the primary and secondary pools of resources 115 and 120. The tests may further be defined at least in part based on a version of software installed in the master server 105 and in the slave server 110. Non-limiting examples of applicable tests are provided in FIGS. 5, 6 and 7.

Figure 5:
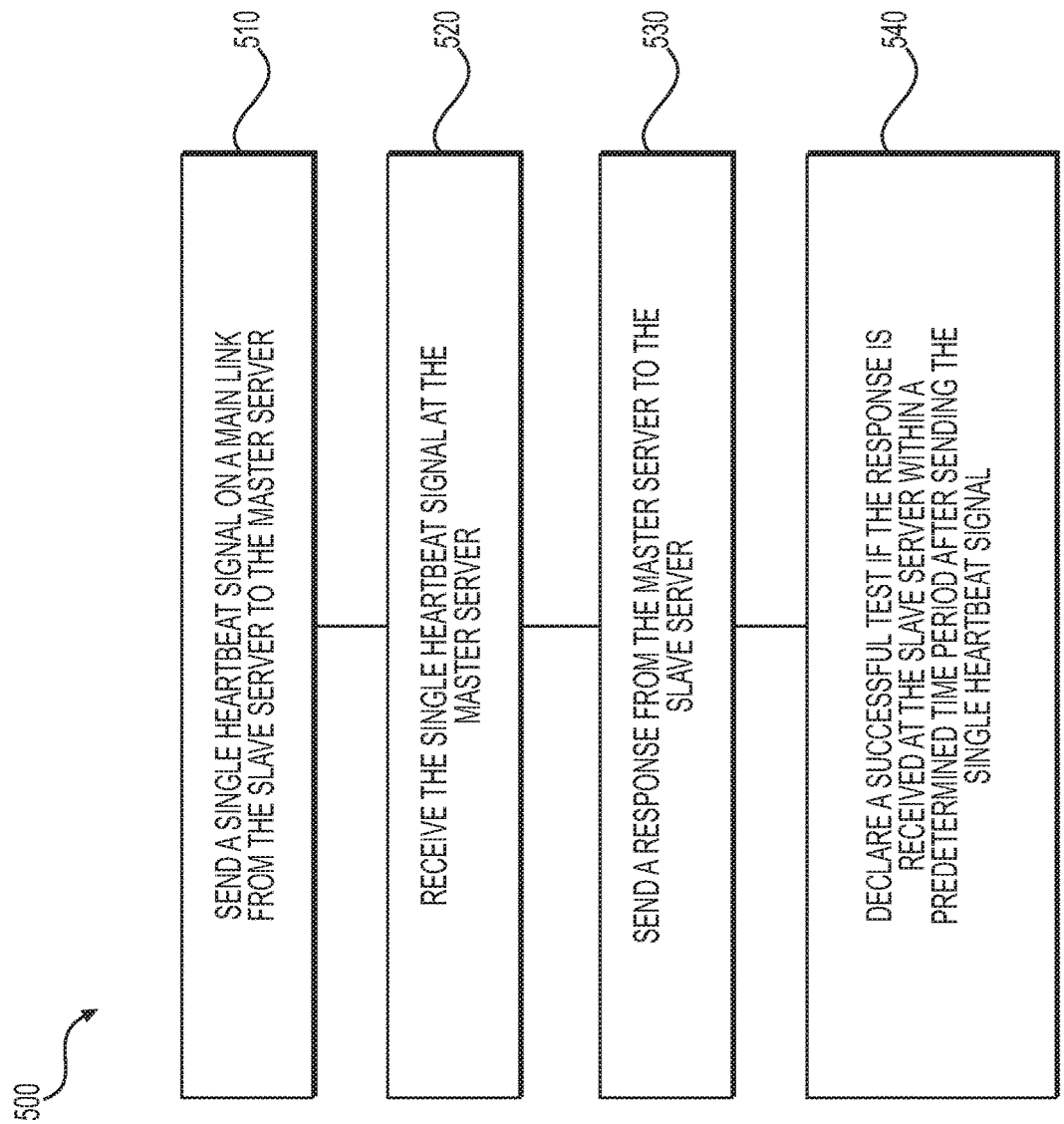
FIG. 5 is a sequence diagram showing operations of a first test in accordance with an embodiment of the present technology.

FIG. 5 is a sequence diagram showing operations of a first test in accordance with an embodiment of the present technology. On FIG. 5, a sequence 500 comprises a plurality of operations that may be executed in variable order, some of the operations possibly being executed concurrently, some of the operations being optional. The sequence 500 starts with operation 510 in which a single heartbeat signal is sent from the slave server 110 to the master server 105. The master server 105 receives the single heartbeat signal at operation 520 and sends a response to the slave server at operation 530. The first test is declared as successful at operation 530 if a response to the single heartbeat signal is received at the slave server 110 within a predetermined time period after sending the single heartbeat signal. In an embodiment, this declaration may be effected by the controller 125 when the slave server 110 informs the controller 125 of the timely response to the single heartbeat signal.

Figure 6:
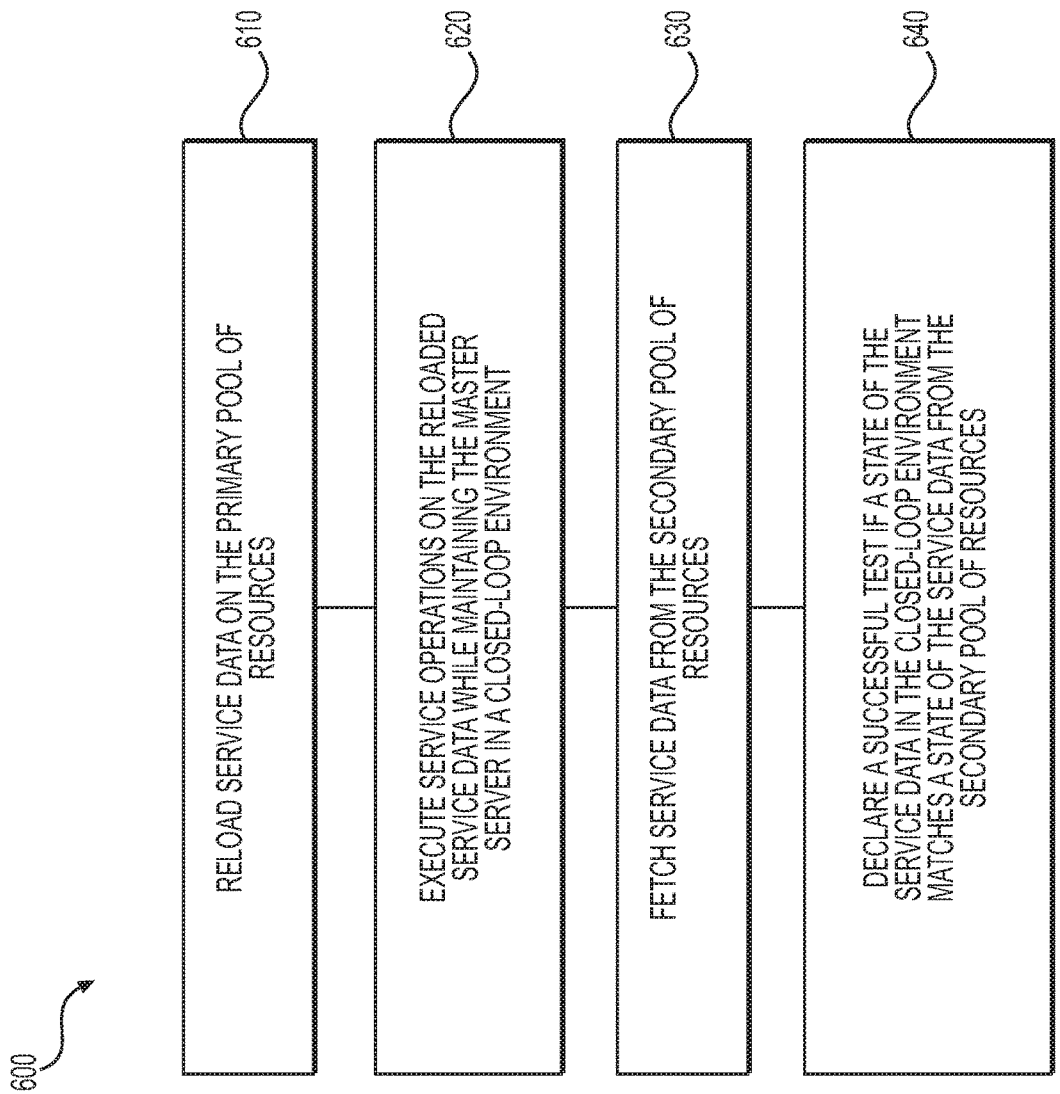
FIG. 6 is a sequence diagram showing operations of a second test in accordance with an embodiment of the present technology.

FIG. 6 is a sequence diagram showing operations of a second test in accordance with an embodiment of the present technology. On FIG. 6, a sequence 600 comprises a plurality of operations that may be executed in variable order, some of the operations possibly being executed concurrently, some of the operations being optional. The sequence 600 starts at operation 610 when the controller 125 causes reloading of service data controlled by the master server 105 on the primary pool of resources 115. The controller 125 then causes an execution of service operations on the reloaded service data while maintaining the master server 105 in a closed-loop environment. In the closed-loop environment, the master server 105 does not communicate with the client 150 or with the slave server 110 so to avoid any data corruption should the fault persist in the master server 105. The controller 125 then fetches service data controlled by the slave server 105 from the secondary pool of resources 120 at operation 630. The controller 125 declares the second test among as successful at operation 640 if a state of the service data in the closed-loop environment matches the service data controlled by the slave server 110.

Figure 7:
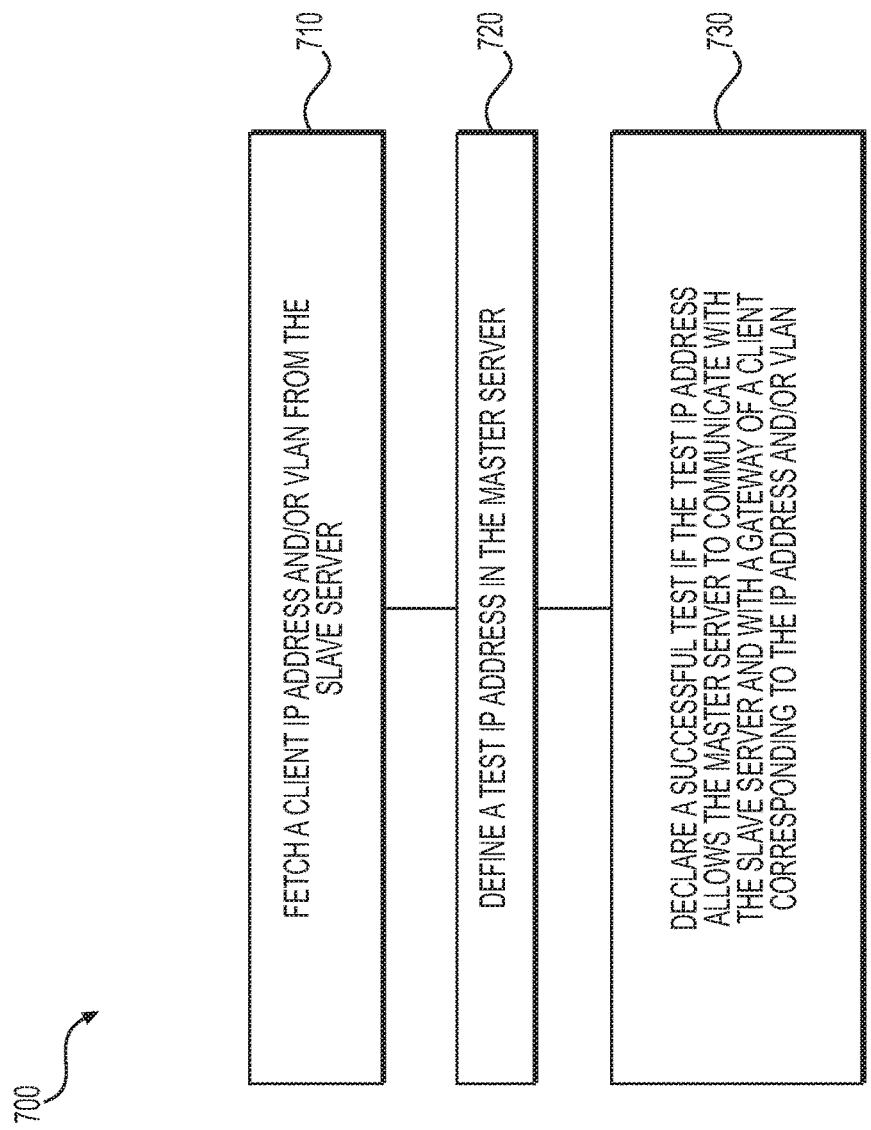
FIG. 7 is a sequence diagram showing operations of a third test in accordance with an embodiment of the present technology.

FIG. 7 is a sequence diagram showing operations of a third test in accordance with an embodiment of the present technology. On FIG. 7, a sequence 700 comprises a plurality of operations that may be executed in variable order, some of the operations possibly being executed concurrently, some of the operations being optional. The sequence 700 starts at operation 710 in which the controller 125 fetches a client IP address and/or a client VLAN from the slave server 110. The controller 125 defines in the master server 105 a test IP address for the client IP address and/or for the client VLAN. The controller 125 declares the third test as successful at operation 730 if the test IP address allows the master server 105 to communicate with the slave server 110 and with a gateway of the client 150 corresponding to the client IP address and/or the client VLAN.

The sequences 500, 600 and 700 of FIGS. 5, 6 and 7 may or may not be present in some embodiments. Other techniques may be used to test whether or not the master server 105 may be safely marked as enabled.

Figure 8:
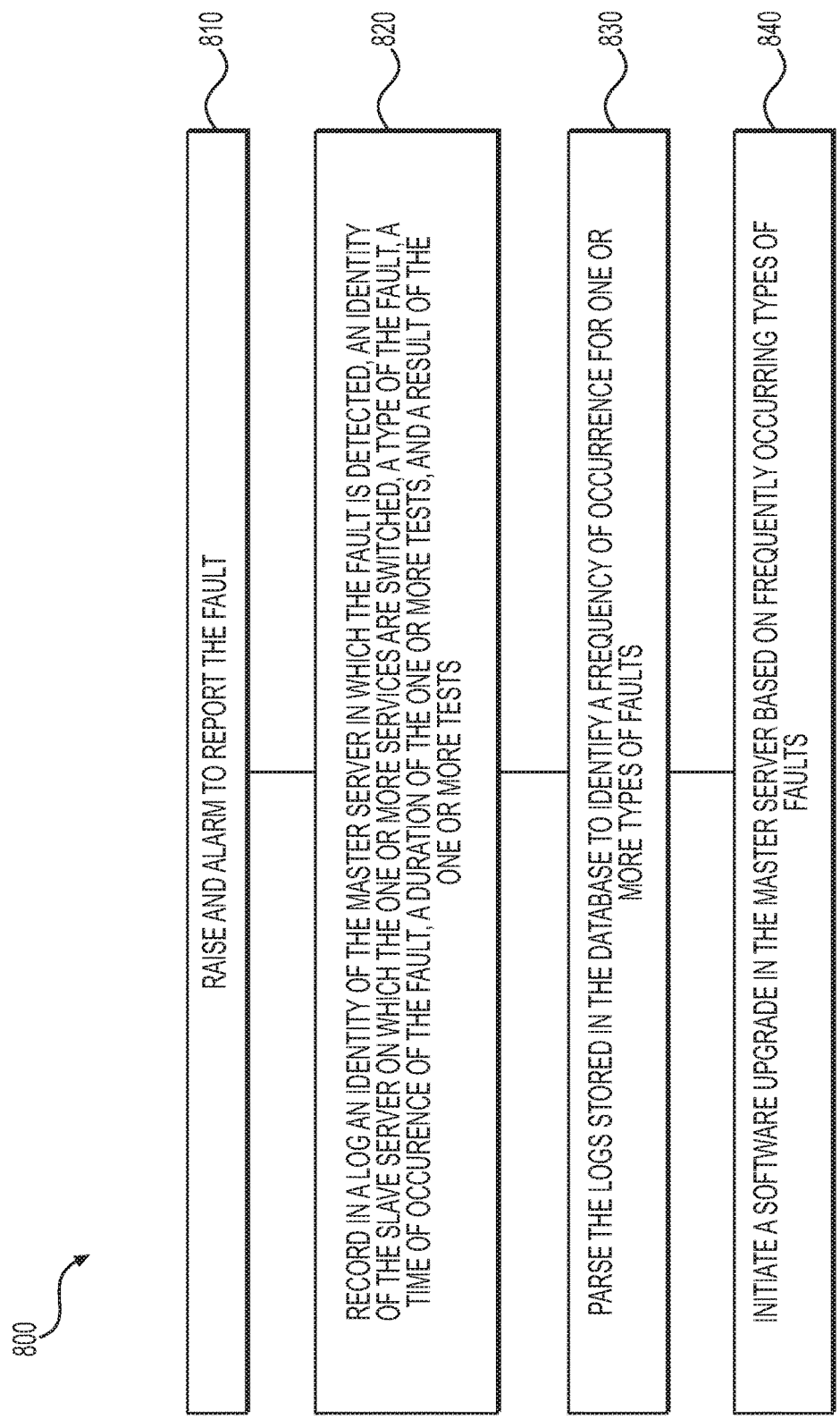
FIG. 8 is a sequence diagram showing operations of an error handling routine in a service infrastructure in accordance with an embodiment of the present technology.

FIG. 8 is a sequence diagram showing operations of an error handling routine in a service infrastructure in accordance with an embodiment of the present technology. On FIG. 8, a sequence 800 comprises a plurality of operations that may be executed in variable order, some of the operations possibly being executed concurrently, some of the operations being optional. The sequence 800 may for example be initiated following operation 445 (FIG. 4), when one or more of the tests performed on the master server 105 have failed. At operation 810, an alarm is raised to report the fault condition on the master server 105. A specific alarm may be raised to report a predetermined number of failed roll backs. A log may store, at operation 820, one or more of an identity of the master server 105 in which the fault is detected, an identity of the slave server 110 on which the one or more services are switched, a type of the fault, a time of occurrence of the fault, a duration of the one or more tests, and a result of the one or more tests. The logs may be parsed at operation 830 to identify a frequency of occurrence for one or more types of faults. Then at operation 840, a software upgrade of the master server may be initiated based on one of the one or more types of faults having a highest frequency of occurrence.

Figure 9:
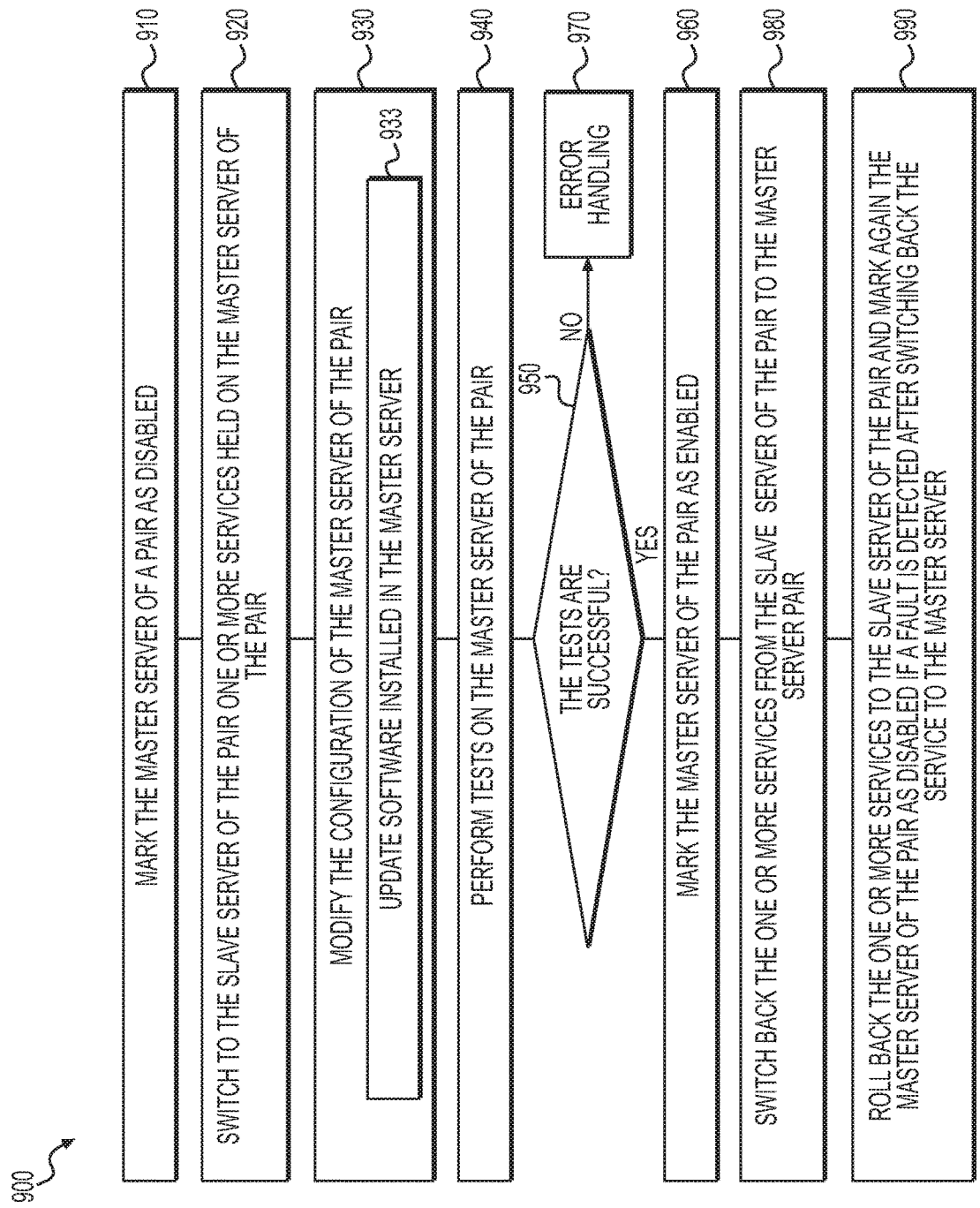
FIG. 9 is a sequence diagram showing operations of a method for updating a configuration in a service infrastructure having a plurality of pairs of master and slave servers in accordance with an embodiment of the present technology.

FIG. 9 is a sequence diagram showing operations of a method for updating a configuration in a service infrastructure having a plurality of pairs of master and slave servers in accordance with an embodiment of the present technology. On FIG. 9, a sequence 900 comprises a plurality of operations that may be executed in variable order, some of the operations possibly being executed concurrently, some of the operations being optional. Operations of the sequence 900 are executed for each pair of master and slave servers 105 and 110 in the service infrastructure 100. In an embodiment, the configuration of one master server 105 may be modified or updated at a time while one corresponding slave server 110 provides serves one or more clients that are normally served by the master server 105 receiving the updates. In another embodiment, configurations of a group of master servers 105 forming all or a subset of the master servers 105 of the service infrastructure 100 may be concurrently modified.

Considering one master server 105 and one slave server 110 forming a pair, the master server 105 is marked as disabled by the controller 125 at operation 910. Following operation 910, the controller 125 causes switching, to the slave server 110, one or more services held on the master server 105 for the client 150 or for a plurality of clients at operation 920. The controller 125 may initiate the modifications to the configuration of the master server 105 at operation 930. Changes to the configuration of the master server 105 may for example comprise modifications applied to some of its data. In a variant, the operation 930 includes a sub-operation 933 in which the modification to the configuration of the master server 105 comprises updating software installed in the master server 105. After the modification of the configuration of the master server 105, the controller 125 performs or causes to perform one or more tests on the master server 105 at operation 940. Verification is made at operation 950 to determine whether the tests are successful. At operation 960, the controller 125 marks the master server 105 as enabled if the tests are successful. If the verification made at operation 950 shows that one or more tests have failed, the sequence 900 ends at operation 970 where an error handling routine is initiated. The error handling routine may for example comprise the above-described sequence 800 (FIG. 8).

At operation 980, the controller causes switching back the one or more services from the slave server 110 to the master server 105. At operation 990, the services may be rolled back to the slave server 110 and the master server 105 may be marked again as disabled if a fault is detected after the switching back to the master server 105. Operation 990 may include the same or equivalent features as those of operations 465, 470 and 475 (FIG. 4).

Figure 10:
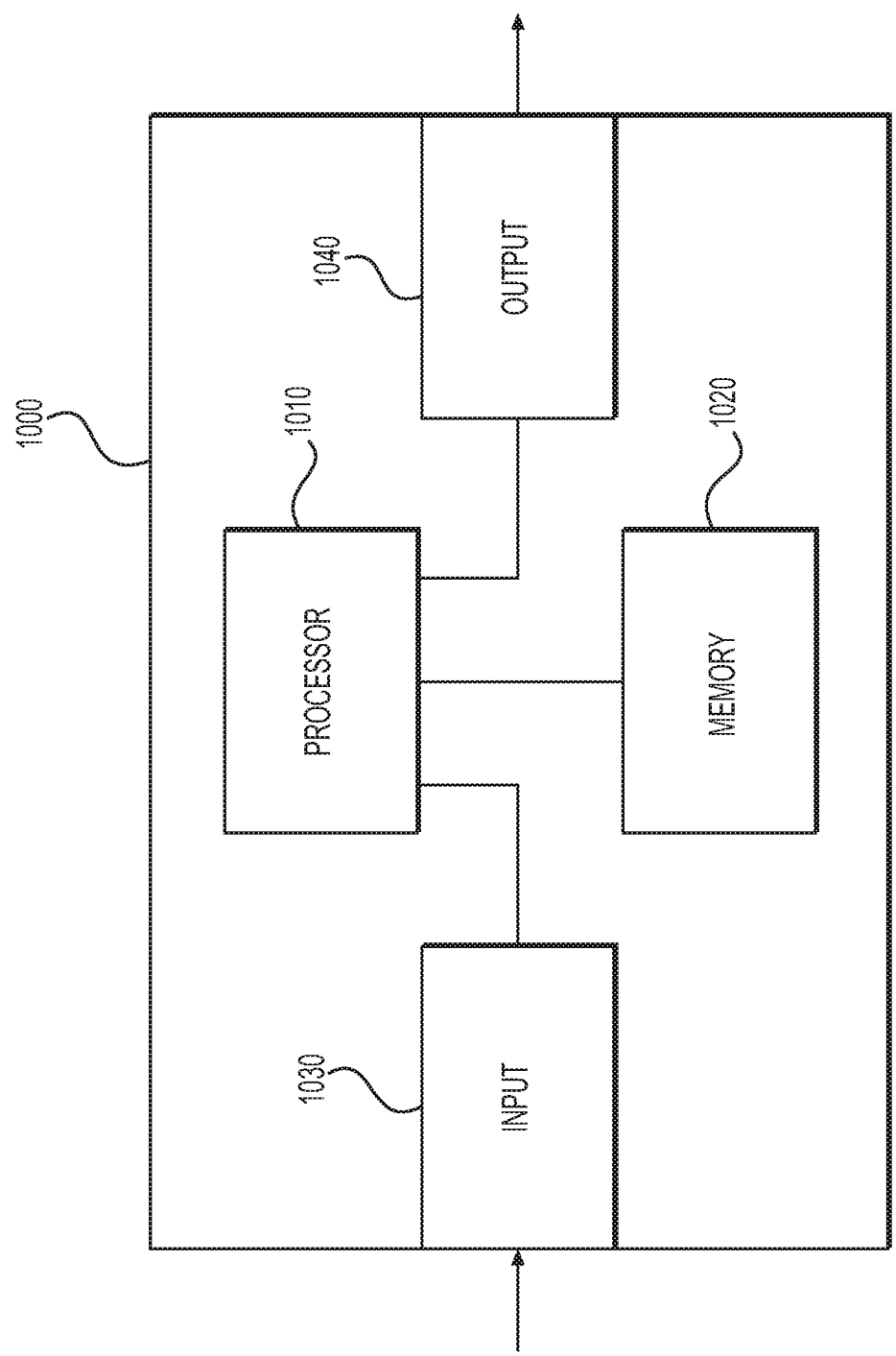
FIG. 10 is a simplified block diagram of internal components of the service architecture of FIG. 1 in accordance with an embodiment of the present technology.

FIG. 10 is a simplified block diagram of internal components of the service architecture of FIG. 1 in accordance with an embodiment of the present technology.

Each of the master server 105, the slave server 110, the controller 125 and the operator interface 130 as well as some of the actual resources 140 and 145 made accessible to the client 150 may be constructed from a device 1000 having an architecture illustrated on FIG. 10. The device 1000 may be a computer, a server, or any similar computing or processing device. The device 1000 comprises a processor or a plurality of cooperating processors (represented as a processor 1010 for simplicity), a memory device or a plurality of memory devices (represented as a memory device 1020 for simplicity), an input device or a plurality of input devices (represented as an input device 1030) and an output device or a plurality of output devices (represented as an input device 1030). The input device 1030 may receive messages, data and other information from other components of the service architecture 100, from an operator and/or from the client 150. The output device 1040 may transmit messages, data and other information to other components of the service architecture 100, to the operator, and/or to the client 150. The input device 1030 and the output device 1040 may be combined in an input/output device. The processor 1010 is operatively connected to the memory device 1020, to the input device 1030 and to the output device 1040.

When the device 1000 implements the master server 105 or the slave server 110, the input device 1030 and the output device 1040 are connected to the main link 170, to the first or second direct link 175 or 185, to the first or second side link 180 or 190, and are further connectable to communicate, directly or indirectly, with the client 150 and the controller 125. The memory device 1020 may store an IP address and/or a virtual local area network (VLAN) of the client 150, a service configuration file for the services provided to the client 150, and may store further information, for example program code for execution by the processor 1010. The processor 1010 executes some of the program code allowing the allocation of some of the actual resources 140 or 145 in the primary or secondary pool of resources 115 or 120 to serve the client 150. Other parts of the program code allow the processor to communicate with other servers (for example between corresponding master and slave servers 105 and 110) and with the controller 125.

When the device 1000 implements the controller 125, the memory device 1020 stores information about the ongoing processes of the service infrastructure 100 including, without limitation, statuses and eventual faults presents in the master servers 105, and statuses of the slave servers 110. The database 135 may be integrated in the memory device 1020 of the controller 135. The input device 1030 and the output device 1040 provide connections to the master server 105, to the slave server 110, to the operator interface 130 and may further provide a connection to the database 135 when the database 135 is not integrated in the memory device 1020 of the controller 125. The memory device 1020 may store further information, for example program code for execution by the processor 1010, for example for controlling the execution of the tests on the master server 105 and for controlling switching, switching back and rolling back of services between the master server 105 and the slave server 110 and/or for parsing of log information stored in the database 135.

When the device 1000 implements the operator interface, the input device 1030 and the output device 1040 provide connections to the controller 125 and to the database 135. The input device 1030 and the output device 1040 may provide a direct operator access via user-operable equipment (not shown) such as a keyboard, a mouse, a display screen a touch-sensitive screen, and the like. The input device 1030 and the output device 1040 may alternatively include a gateway connectable to remote user-operable equipment. In either case, the input device 1030 can receive operator commands and the output device can forward alarms and present data for use by the operator. The memory device 1020 may store program code for execution by the processor 1010, for example for controlling the handling of commands from the operator and for presentation of data from logs stored in the database 135.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

The methods and systems implemented in accordance with some non-limiting embodiments of the present technology can be represented as follows, presented in numbered clauses.

Clauses

[Clause 1] A method for providing service redundancy between a master server and a slave server, comprising:
  detecting a fault on the master server;
  in response to detecting the fault, marking the master server as disabled;
  in response to detecting the fault, switching to the slave server one or more services held on the master server;
  if the master server is down after switching the one or more services to the slave server, restarting the master server until the master server is up;
  after switching the one or more services to the slave server and when the master server is up, performing one or more tests on the master server; and
  if the one or more tests are successful, marking the master server as enabled.

[Clause 2] The method of clause 1, further comprising raising an alarm if at least one of the one or more tests is unsuccessful.

[Clause 3] The method of clause 1 or 2, further comprising sending a copy of first data related to the one or more services from the master server to the slave server when the one or more services are held on the master server.

[Clause 4] The method of any one of clauses 1 to 3, wherein:
  a primary pool of resources has a first direct link to the master server;
  a secondary pool of resources has a second direct link to the slave server; and
  the primary and secondary pools of resources have equivalent configurations.

[Clause 5] The method of clause 4, wherein the resources of the primary and secondary pools of resources are selected from memory devices, disks, disk drives, computers, auxiliary servers, game servers, and a combination thereof.

[Clause 6] The method of clause 4 or 5, further comprising sending copies of second data related to the one or more services from the master server to each of the primary and secondary pools of resources when the one or more services are held on the master server.

[Clause 7] The method of clause 6, wherein:
  a copy of the second data related to the one or more services is sent from the master server on a first side link to the secondary pool of resources;
  the method further comprising blocking the first direct link and the first side when the master server is disabled.

[Clause 8] The method of clause 7, further comprising sending copies of the second data related to the one or more services from the slave server to the primary pool of resources via a second side link and to the secondary pool of resources via the second direct link when the master server is disabled.

[Clause 9] The method of any one of clauses 1 to 8, further comprising:
  periodically sending heartbeat signals on a main link from the slave server to the master server;
  receiving each heartbeat signal causing the master server to send a response on the main link from the master server to the slave server; and
  the fault on the master server being detected when no response to a given heartbeat signal is received at the slave server within a predetermined time period after sending the given heartbeat signal.

[Clause 10] The method of any one of clauses 1 to 9, further comprising:
  after marking the master server as disabled, reconfiguring the slave server as a new master server; and
  reconfiguring the master server as a new slave server if the one or more tests are successful.

[Clause 11] The method of any one of clauses 1 to 9, further comprising switching back the one or more services from the slave server to the master server if the one or more tests are successful.

[Clause 12] The method of any one of clauses 1 to 9, further comprising:
  disabling the service redundancy when at least one of (i) an indication about a software update to the master server, (ii) an indication about a physical intervention on the master server, and (iii) a maintenance indication is set; and
  enabling the service redundancy when none of (i) the indication about a software update to the master server, (ii) the indication about a physical intervention on the master server, and (iii) the maintenance indication is set.

[Clause 13] The method of clause 12, further comprising switching back the one or more services from the slave server to the master server if the one or more tests are successful and the service redundancy is enabled.

[Clause 14] The method of clause 11 or 13, further comprising rolling back the one or more services to the slave server and marking again the master server as disabled if a new fault is detected after the switching back.

[Clause 15] The method of clause 14, further comprising:
  starting a timer after the rolling back; and
  upon expiry of the timer:
    if the master server is down, restarting again the master server until the master server is up,
    when the master server is up, performing again the one or more tests on the master server, and
    marking again the master server as enabled if the one or more performed again tests are successful.

[Clause 16] The method of clause 15, further comprising raising an alarm after a predetermined number of failed rolling backs.

[Clause 17] The method of any one of clauses 1 to 21, further comprising storing in a log one or more of an identity of the master server in which the fault is detected, an identity of the slave server on which the one or more services are switched, a type of the fault, a time of occurrence of the fault, a duration of the one or more tests, and a result of the one or more tests.

[Clause 18] The method of clause 17, further comprising parsing the log stored in the log to identify a frequency of occurrence for one or more types of faults.

[Clause 19] The method of clause 18, further comprising initiating a software upgrade in the master server based on one of the one or more types of faults having a highest frequency of occurrence.

[Clause 20] A method for updating a configuration in a service infrastructure having a plurality of pairs of master and slave servers, comprising for each pair of master and slave servers:
    marking the master server of a pair as disabled;
    after marking the master server of the pair as disabled, switching to the slave server of the pair one or more services held on the master server of the pair;
    modifying the configuration of the master server of the pair;
    after modifying the configuration of the master server of the pair, performing one or more tests on the master server of the pair; and
    if the one or more tests are successful, marking the master server of the pair as enabled and switching back the one or more services from the slave server of the pair to the master server of the pair.

[Clause 21] The method of clause 20, further comprising raising an alarm if at least one of the one or more tests is unsuccessful.

[Clause 22] The method of clause 20 or 21, wherein updating the configuration comprises updating software installed in the master servers.

[Clause 23] The method of any one of clauses 20 to 22, further comprising modifying the configuration of one of the master servers at a time.

[Clause 24] The method of any one of clauses 20 to 22, further comprising concurrently modifying the configuration of a subset of the master servers at a time.

[Clause 25] The method of any one of clauses 20 to 24, further comprising rolling back the one or more services to the slave server of a given pair and marking again the master server of the given pair as disabled if a fault is detected after the switching back to the given master server.

[Clause 26] The method of any one of clauses 1 to 25, wherein the one or more services are defined for one or more clients.

[Clause 27] The method of any one of clauses 1 to 26, further comprising preventing any communication between the master server and the slave server when the master server is marked as disabled.

[Clause 28] The method of any one of clauses 1 to 27, further comprising storing copies of a service configuration file in the master server and in the slave server when the master server is marked as enabled.

[Clause 29] The method of any one of clauses 1 to 28, wherein the one or more tests are defined at least in part based on types of the one or more services.

[Clause 30] The method of any one of clauses 1 to 29, wherein the one or more tests are defined at least in part based on types of equipment controlled by the master and slave servers.

[Clause 31] The method of any one of clauses 1 to 30, wherein the one or more tests are defined at least in part based on a version of software installed in the master and slave servers.

[Clause 32] The method of any one of clauses 1 to 31, further comprising:
    sending a single heartbeat signal from the slave server to the master server; and
    declaring a first test among the one or more tests as successful if a response to the single heartbeat signal is received at the slave server within a predetermined time period after sending the single heartbeat signal.

[Clause 33] The method of any one of clauses 1 to 32, further comprising:
    reloading service data controlled by the master server;
    executing service operations on the reloaded service data while maintaining the master server in a closed-loop environment;
    fetching service data controlled by the slave server; and
    declaring a second test among the one or more tests as successful if a state of the service data in the closed-loop environment matches the service data controlled by the slave server.

[Clause 34] The method of any one of clauses 1 to 33, wherein a third test among the one or more tests comprises:
    fetching a client IP address and/or a client VLAN from the slave server;
    defining a test IP address in the master server; and
    declaring a third test among the one or more tests as successful if the test IP address allows the master server to communicate with the slave server and with a gateway of a client corresponding to the client IP address and/or the client VLAN.

[Clause 35] A system for providing service redundancy, comprising:
    a master server;
    a slave server; and
    a controller operatively connected to the master server and to the slave server, the controller being configured to:
    receive information about a fault on the master server,
    in response to receiving the information about the fault, (i) mark the master server as disabled, (ii) cause one or more services held on the master server to switch to the slave server, and (iii) if the master server is down, cause a restart of the master server until the master server is up,
    after the switch of the one or more services to the slave server and when the master server is up, perform one or more tests on the master server, and if the one or more tests are successful, mark the master server as enabled.

[Clause 36] The system of clause 35, further comprising a main link connecting the master server to the slave server, the master server being adapted to send a copy of first data related to the one or more services to the slave server when the one or more services are held on the master server.

[Clause 37] The system of clause 36, wherein the slave server is adapted to:
    periodically send heartbeat signals on the main link from the slave server to the master server;
    receive responses to the heartbeat signals on the main link from the master server to the slave server; and inform the controller that the fault is present on the master server when no response to a given heartbeat signal is received within a predetermined time period after sending the given heartbeat signal.

[Clause 38] The system of clause 36 or 37, further comprising:
a primary pool of resources connected to the master server via a first direct link and to the slave server via a second side link; and
a secondary pool of resources connected to the slave server via a first direct link and to the master server via a first side link.

[Clause 39] The system of clause 38, wherein the resources of the primary and secondary pools of resources are selected from memory devices, disks, disk drives, computers, auxiliary servers, game servers, and a combination thereof.

[Clause 40] The system of clause 38 or 39, wherein:
the master server is adapted to send copies of second data related to the one or more services via the first direct link to the primary pool of resources and via the first side link to the secondary pool of resources when the one or more services are held on the master server; and
the slave server is adapted to send a copy of the second data related to the one or more services via the second side link to the primary pool of resources when the master server is marked as disabled.

[Clause 41] The system of clause 38 to 40, wherein the controller is further adapted to block the first direct link, the first side link and the main link when the master server is marked as marked as disabled.

[Clause 42] The system of any one of clauses 35 to 41, wherein the controller is further adapted to cause a switch back of the one or more services from the slave server to the master server when the master server is marked as enabled.

[Clause 43] The system of any one of clauses 35 to 41, further comprising:
an operator interface operatively connected to the controller and adapted to forward operator commands to the controller, the operator commands being related to one or more of a software update of the master server, a physical intervention on the master server, and a maintenance of the master server;
the controller being further adapted to:
disable the service redundancy when at least one of the one or more operator commands is received at the operator interface,
enable the service redundancy when none of the operator commands is received at the operator interface, and
cause a switch back of the one or more services from the slave server to the master server when the master server is marked as enabled and the service redundancy is enabled.

[Clause 44] The system of clause 43, wherein the operator interface is further adapted to raise an alarm if at least one of the one or more tests is unsuccessful.

[Clause 45] The system of any one of clauses 35 to 42, further comprising a database operatively connected to the controller and adapted to store a log containing one or more of an identity of the master server in which the fault is detected, an identity of the slave server on which the one or more services are switched, a type of the fault, a time of occurrence of the fault, a duration of the one or more tests, and a result of the one or more tests.

[Clause 46] The system of clause 45, further comprising an operator interface operatively connected to the controller and to the database and adapted to output a content of the log.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for providing service redundancy between a master server and a slave server, comprising: detecting a fault on the master server; in response to detecting the fault, marking by a controller the master server as disabled; in response to detecting the fault, switching to the slave server by the controller one or more services held on the master server; if the master server is down after switching by the controller the one or more services to the slave server, restarting the master server until the master server is up; after switching the one or more services to the slave server and when the master server is up, performing one or more tests on the master server; and if the one or more tests are successful, marking by the controller the master server as enabled; wherein a first test among the one or more tests comprises: reloading service data controlled by the master server; executing service operations on the reloaded service data while maintaining the master server in a closed-loop environment; fetching service data controlled by the slave server; and declaring the first test as successful if a state of the service data in the closed-loop environment matches the service data controlled by the slave server wherein the controller comprises: at least one processor, at least one memory device, and at least one device or combination of devices adapted for transmitting messages to the master server and to the slave server and for receiving messages from the master server and from the slave server.

2. The method of claim 1, wherein:
a primary pool of resources has a first direct link to the master server;
a secondary pool of resources has a second direct link to the slave server; and
the primary and secondary pools of resources have equivalent configurations.

3. The method of claim 2, further comprising:
when the one or more services are held on the master server:
sending a copy of first data related to the one or more services from the master server to the slave server,
sending a first copy of second data related to the one or more services from the master server to the primary pool of resources via the first direct link, and
sending a second copy of the second data related to the one or more services from the master server to the secondary pool of resources via a first side link; and
when the master server is disabled:
blocking the first direct link and the first side link,
sending a third copy of the second data related to the one or more services from the slave server to the primary pool of resources via a second side link, and
sending a fourth copy of the second data related to the one or more services to the secondary pool of resources via the second direct link.

4. The method of claim 1, further comprising:
periodically sending heartbeat signals on a main link from the slave server to the master server;
receiving each heartbeat signal causing the master server to send a response on the main link from the master server to the slave server; and
the fault on the master server being detected when no response to a given heartbeat signal is received at the slave server within a predetermined time period after sending the given heartbeat signal.

5. The method of claim 1, further comprising switching back the one or more services from the slave server to the master server if the one or more tests are successful.

6. The method of claim 5, further comprising:
rolling back the one or more services to the slave server and marking again the master server as disabled if a new fault is detected after the switching back;
starting a timer after the rolling back; and
upon expiry of the timer:
if the master server is down, restarting again the master server until the master server is up,
when the master server is up, performing again the one or more tests on the master server, and
marking again the master server as enabled if the one or more performed again tests are successful.

7. The method of claim 1, further comprising:
sending a single heartbeat signal from the slave server to the master server; and
declaring a second test among the one or more tests as successful if a response to the single heartbeat signal is received at the slave server within a predetermined time period after sending the single heartbeat signal.

8. The method of claim 1, wherein a third test among the one or more tests comprises:
fetching a client IP address and/or a client VLAN from the slave server;
defining a test IP address in the master server; and
declaring a third test among the one or more tests as successful if the test IP address allows the master server to communicate with the slave server and with a gateway of a client corresponding to the client IP address and/or the client VLAN.

9. A system for providing service redundancy, comprising: a master server; a slave server; and a controller operatively connected to the master server and to the slave server, the controller comprising: at least one processor, at least one memory device, and at least one device or combination of devices adapted for transmitting messages to the master server and to the slave server and for receiving messages from the master server and from the slave server; the controller being configured to: receive information about a fault on the master server, in response to receiving the information about the fault, (i) mark the master server as disabled, (ii) cause one or more services held on the master server to switch to the slave server, and (iii) if the master server is down, cause a restart of the master server until the master server is up, after the switch of the one or more services to the slave server and when the master server is up, perform one or more tests on the master server, and if the one or more tests are successful, mark the master server as enabled; wherein a first test among the one or more tests comprises: causing a reload of service data controlled by the master server; causing an execution of service operations on the reloaded service data while maintaining the master server in a closed-loop environment; fetching service data controlled by the slave server; and declaring a first test among the one or more tests as successful if a state of the service data in the closed-loop environment matches the service data controlled by the slave server.

10. The system of claim 9, further comprising a main link connecting the master server to the slave server, the master server being adapted to send a copy of first data related to the one or more services to the slave server when the one or more services are held on the master server.

11. The system of claim 10, further comprising:
a primary pool of resources connected to the master server via a first direct link and to the slave server via a second side link; and
a secondary pool of resources connected to the slave server via a second direct link and to the master server via a first side link.

12. The system of claim 11, wherein:
the master server is adapted to send copies of second data related to the one or more services via the first direct link to the primary pool of resources and via the first side link to the secondary pool of resources when the one or more services are held on the master server; and
the slave server is adapted to send a copy of the second data related to the one or more services via the second side link to the primary pool of resources when the master server is marked as disabled.

13. The system of claim 9, further comprising:
an operator interface operatively connected to the controller and adapted to forward operator commands to the controller, the operator commands being related to one or more of a software update of the master server, a physical intervention on the master server, and a maintenance of the master server;
the controller being further adapted to:
disable the service redundancy when at least one of the one or more operator commands is received at the operator interface,
enable the service redundancy when none of the operator commands is received at the operator interface, and
cause a switch back of the one or more services from the slave server to the master server when the master server is marked as enabled and the service redundancy is enabled.

14. The system of claim 9, further comprising a database operatively connected to the controller and adapted to store a log containing one or more of an identity of the master server in which the fault is detected, an identity of the slave server on which the one or more services are switched, a type of the fault, a time of occurrence of the fault, a duration of the one or more tests, and a result of the one or more tests.

* * * * *